United States Patent [19]
Griffith

[11] 3,904,920
[45] Sept. 9, 1975

[54] SAFETY LIGHTING SYSTEM
[76] Inventor: Ronald A. Griffith, 1761 Kenilworth Dr., Clearwater, Fla. 33516
[22] Filed: Apr. 12, 1973
[21] Appl. No.: 350,574

[52] U.S. Cl. .............. 315/78; 240/7.1 A; 240/7.6; 315/79; 315/86
[51] Int. Cl.² ........................................ B60Q 1/26
[58] Field of Search ........... 240/7.1 A, 7.6; 315/77, 315/78, 79, 86; 320/61; 307/66

[56] References Cited
FOREIGN PATENTS OR APPLICATIONS
1,031,943  3/1953  France .......................... 240/7.6 X
1,063,662  12/1953  France .......................... 240/7.6 X Primary Examiner—R. V. Rolinec
Assistant Examiner—Lawrence J. Dahl
Attorney, Agent, or Firm—Hall and Myers

[57] ABSTRACT
Provided is a multi-source circuit for supplying electrical current to a bicycle lighting system. The circuit comprises an A-C generator mounted to be driven by a wheel of the bicycle, a battery, means connected to the generator for rectifying the current produced by the generator, and sensing means connected to the rectifying means for determining when voltage at the rectifying means exceeds a predetermined voltage, the sensing means allowing battery current to flow through the lighting system when the voltage at the rectifying means is less than said predetermined voltage and allowing generator current to flow through the lighting system when the voltage of the rectifying means is greater than the predetermined voltage. Also, provided in certain preferred circuits, is a recharging circuit for recharging the battery, which circuit is connected between the means for rectifying and the battery and includes a diode so located to allow recharging current to flow when the voltage at the rectifying means exceeds the battery voltage, but prevents the battery from activating the sensing means.

3 Claims, 1 Drawing Figure

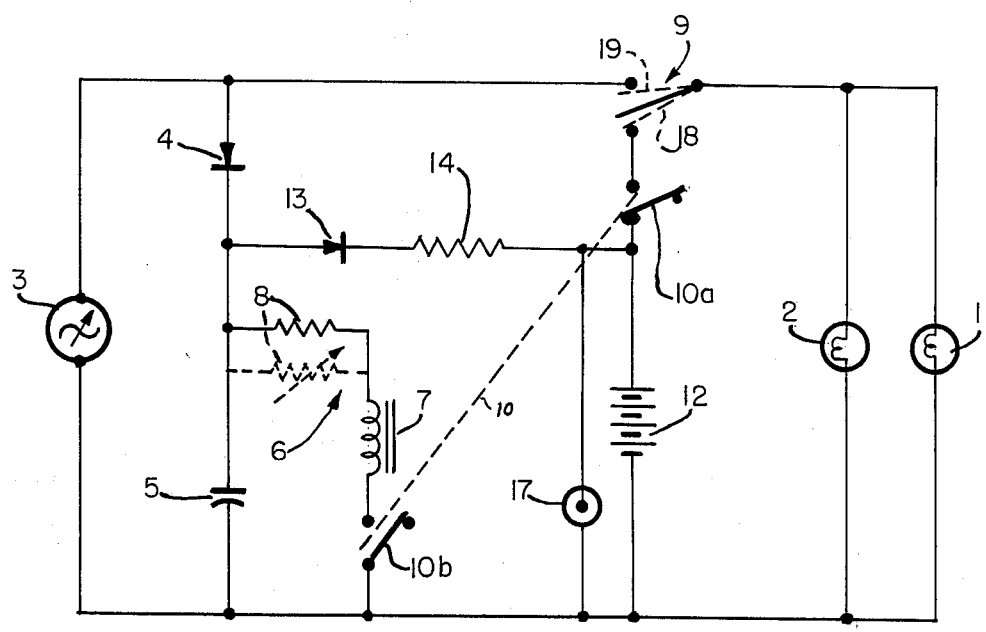

SAFETY LIGHTING SYSTEM

This invention relates to bicycle lights. More specifically, this invention relates to a combined battery-generator operated safety light system useful on bicycles.

In recent years, heavy emphasis has been placed upon the usefulness of the bicycle as opposed to automobiles in the environmental scheme of things. Additional emphasis has been placed upon the exercise and enjoyment attained through bicycle riding. This has caused an ever increasing number of bicycles to appear on our roads and highways which, at dusk or dark, can create a hazardous situation.

The need for providing safety lights on bicycles has long been recognized. Generally speaking, these bicycle lights are either of the battery operated type, or of the generator operated type. In a few instances, attempts have been made to combine a generator and a battery operated type such that when the bicycle stops, the batteries take over to light the lights, while, on the other hand, the bicycle is in motion, the generator serves to operate the lights. Such a combined system represents a significant improvement over one or the other of the uncombined systems in that it maintains a constant source of safety light on the bike, without reliance upon reflectors and the like.

While combined generator - battery operated devices have proved operative, they have often been limited in the functions which they can perform, are quite complex, expensive to manufacture, and/or are not reliable. One known device, for example, includes a rather complex governor mechanism for switching from battery to generator and back again, which mechanism is quite complex, difficult to manufacture correctly, and is expensive. Another known device employs a manual switch which enables the driver of the vehicled to manually switch from generator to battery. This is, of course, relatively unacceptable in that it relies upon human memory and reflex to change and thereby maintain safety. In addition to these drawbacks, many other systems which desire to recharge the batteries, have characteristically employed DC generators, the drawbacks of which are well known.

Examples of prior art devices employed for lighting vehicles generally, and particularly bicycles, are represented by the following United States Patents:

| | | |
|---|---|---|
| 542,771 | 1,033,560 | 2,488,021 |
| 576,933 | 1,137,831 | 2,299,762 |
| 662,580 | 1,157,011 | 3,171,058 |
| 720,605 | 1,714,483 | 3,430,100 |

It is evident from the above that there exists a definite need in the art for a bicycle safety light system which employs both a generator and a battery and a technique for coordinating the two so as to provide continuous safety illumination regardless of whether or not the bike is in operation, but at the same time is simple and easy to manufacture, readily mountable, adding little weight to the boke, and is inexpensive, thus encouraging use. It is a purpose of this invention to fulfill this and other needs in the art which will become more apparent to the skilled artisan once given the following detailed disclosure of the invention.

Generally speaking, this invention fulfills the above described needs in the art by providing a bicycle or other wheeled vehicle lighting system which comprises an AC generator mounted to be driven by operation of the vehicle, a battery, means connected to said generator for rectifying the current produced by said generator, and sensing means connected to said rectifier means for determining when the voltage of said rectifying means exceeds a predetermined voltage, said sensing means allowing battery current to flow through said lighting system when the voltage of said rectifying means is greater than said predetermined voltage. In certain preferred embodiments this invention also includes means for recharging the battery which means generally comprises a recharging circuit connected between the rectifying means and said battery, and includes a diode to allow recharging current to flow when the voltage at the rectifying means exceeds the battery voltage, but prevents the battery from discharging through the recharging circuit and activating the sensing means.

The above described combination invention also has within it a unique sub-combination in which the generator is eliminated. Such a sub-combination forms a light system for bicycles which are already provided with a lighting system that includes lamps and an AC generator. By merely replacing the circuit and battery (if any) already on the bicycle with the unique sub-combination of this invention, the unique combination of this invention, as described above, is easily and inexpensively formed.

This invention will now be described with respect to certain embodiments thereof and accompanying illustrations wherein:

IN THE DRAWINGS

The FIGURE is a schematic diagram of a particularly preferred multi-source circuit for supplying electrical current to a bicycle lamp system.

DETAILED DESCRIPTION

Referring to this FIGURE, there is illustrated a unique circuit for providing a lighting system on a bicycle in accordance with this invention. It is understood, of course, that this figure illustrates the combination invention. Elimination of the lamps and A-C generator therefrom described for the skilled artisan the unique sub-combination as set forth above. Included within this circuit is headlamp 1 usually located on the front fender or handlebars of the bicycle and rear safety lamp 2 usually located on the rear of the seat, or back fender, of the bicycle. Further included is an A-C generator 3 of known construction which generates A-C power by rotation of the wheels of the bicycle. Still further located within the circuit is a diode 4 and a capacitor 5 which serve to rectify (i.e. rectify and filter respectively) the voltage generated by generator 3.

Within the circuit there is also located, as illustrated, a relay means generally indicated at 6 which comprises a relay 7 of known construction and a resistance 8. Resistance 8 may be either fixed or variable (as shown in the dotted lines).

Located within the circuit and responsive to relay means 6 is relay contact 9. As will be described more fully hereinafter, relay contact 9, responsive to relay means 6, is capable of opening and closing either side of the circuit depending upon a predetermined voltage value built into relay means 6 by resistance 8.

The system also preferably includes an on/off switch 10 of known construction (shown schematically as a dotted line) which simultaneously operates an on/off battery switch 10a and an on/off relay coil switch 10b. Further included in the system is DC battery 12. DC battery 12, hereinafter more fully described, illuminates lamps 1 and 2 when switch 10 is closed and generator 3 is not producing above the aforesaid predetermined voltage value. Battery 12 may be either a standard non-rechargeable battery, or in a preferred instance, a rechargeable battery that may be either stationary within the system (as illustrated) or removable. In those instances where battery 12 is rechargable, it may be recharged in accordance with conventional techniques from a standard wall outlet without removing it from the system by further, and optionally, including within the system a conventional charging jack or plug 17.

In the preferred embodiments of this invention and as a further unique aspect of the circuits thereof, there is provided a recharging means for recharging battery 12 during the operation of the wheeled vehicle. Such a recharging means includes a diode 13 so located as to provide the necessary recharging current from AC generator 3 when the voltage exceeds the battery voltage, but which prevents the battery from activating relay system 6. In certain instances it may be desirable to limit the recharging current being applied to battery 12. This may be accomplished by further providing within the recharging system a resistor 14. Such an optional feature limits recharging current in accordance with the value of the parts employed.

All of the components employed in the circuit of this invention are simple, relatively inexpensive, easily obtained and easily mounted within the circuit. For example, the batteries employed may be of any conventional type such as a five volt no load type. The diodes employed may be of any conventional silicon diode type which operates at about one amp. and 50 volts or less. A typical value for a conventional capacitor 5 would be approximately 1,000 mfd. and 16 volts. Relay 7 may be of any conventional type and preferably is of the 3 volt SPDT type. Resistance 8 may have a value of about 27 ohms or above in a typically operating circuit. In the illustrated embodiment this is the primary component for setting the voltage value at which relay 7 will be activated when resistance 8 is about 27 ohms or above. In the illustrated embodiment, relay 7 is actuated when generator 3, generates something more than 3 volts of rectified voltage. Such a predetermined value has been found sufficient to ensure proper safety lighting for bicycles using conventional lamps. The connection between on/off swtiches 10a–b may be a conventional DPST level action connection.

As can be seen from the above, such a circuit is simple to manufacture, easily operated, and yet overcomes the problems of the prior art attendant with those known devices.

This invention will now be more fully described with respect to a typical operation thereof. Assume for a moment that it is dark and that the rider of a bicycle approaches his bike. By activating on/off switch 10, on/off battery switch 10a and on/off relay coil switch 10b are simultaneously activated. This turns on headlamp 1 and rear safety lamp 2 via battery power because relay contact 9 is closed in a relaxed state (position 18) since no generator current is flowing. In the relaxed condition the relay contacts allow current to flow from the battery 12 through the lamps 1 and 2. As the rider begins to pedal the bicycle and thus generate voltage via AC generator 3, this voltage is rectified by diode 4 and filtered by capacitor 5. This rectified voltage is continuously sensed by relay means 6. As predetermined by the relay system and particularly resistance 8, when the voltage generated by AC generator 3 exceeds that point at which it is capable of sustaining the necessary lighting value in lamps 1 and 2, relay 7 is caused to activate relay contact 9 so as to open the battery circuit and close the AC generator circuit (position 19). This, of course, has the effect of removing the drain from the battery and sending AC current directly to lamps 1 and 2 for lighting the system. During this generation of AC voltage there is also being caused to flow through the circuit a recharging voltage via rectifying diode 4, diode 13 (serving as a one way switch) and through resistor 14 serving for overcharge protection, provided that the generated voltage is greater than the battery voltage.

Further to the operation of this circuit, should the bicycle slow down, or come to a stop street, safety illumination is not lost. This is because relay means 6 causes relay contact 9 to revert from position 19 into position 18 if the necessary current to illuminate lamps 1 and 2 is not being created by operation of AC generator 3. In this reversionary position, the circuit is switched from AC voltage to the battery voltage thus to provide the necessary illumination for safety purposes. The system is, of course, deactivated by opening on/off switch 10 when the bicycle is no longer needed for use.

Once given the above disclosure, many other features, modifications and improvements will become apparent to the skilled artisan. Such other features, modifications and improvements are therefore considered to be a part of this invention, the scope of which is to be determined by the following claims.

I claim:

1. A wheeled vehicle lighting system, particularly for a bicycle, by which current is supplied to a lamp for the vehicle from both a generator and a battery, and by which simultaneous recharging of the battery is effected, said system comprising: an AC generator mounted to be driven by operation of said wheeled vehicle; a rechargeable battery; a vehicle lamp; two semiconductor diodes connected together and to one terminal of said generator, one of said diodes defining a rectification means for said generator, the other of said diodes being further connected to one terminal of said battery, said other diode defining a voltage sensing means responsive to a voltage differrential between the voltage at the junction of said diodes and the battery voltage for effecting charging of the battery with current flowing therethrough from said generator only when the rectified half-wave generator output voltage exceeds the battery voltage; a multi-position switch means, one position of said switch means connecting said one terminal of said battery to said lamp, another position of said switch means disconnecting said battery and electrically coupling said one terminal of said generator to said lamp, charging of said battery being effected in both switch positions; and wherein the arrangement is such that battery current automatically flows through said lamp when said output voltage of said generator is less than said battery voltage, generator current automatically flowing through said lamp and the battery continuously charging when said output voltage of said generator exceeds the battery voltage.

2. A system as defined in claim 1, further including a smoothing capacitor connected across said generator and said one diode.

3. A system as defined in claim 2, wherein said multi-position switch means is a relay having an energization winding connected across said smoothing capacitor, said winding being responsive to the rectified voltage of said generator for automatically effecting switching of said multi-position switch means.

* * * * *